US012792779B1

(12) United States Patent
Sanchez Rola

(10) Patent No.: US 12,792,779 B1
(45) Date of Patent: Nov. 10, 2026

(54) PROTECTING THE PRIVACY OF USERS PERFORMING SENSITIVE INTERNET SEARCHES

(71) Applicant: Gen Digital Inc., Tempe, AZ (US)

(72) Inventor: Iskander Sanchez Rola, Antibes (FR)

(73) Assignee: GEN DIGITAL INC., Tempe, AZ (US)

(*) Notice: Subject to any disclaimer, the term of this patent is extended or adjusted under 35 U.S.C. 154(b) by 273 days.

(21) Appl. No.: 18/446,688

(22) Filed: Aug. 9, 2023

(51) Int. Cl.
*G06F 21/62* (2013.01)
*G06F 16/953* (2019.01)

(52) U.S. Cl.
CPC ........ *G06F 21/6263* (2013.01); *G06F 16/953* (2019.01)

(58) Field of Classification Search
CPC ........................... G06F 16/953; G06F 21/6263
USPC ........................................................... 726/26
See application file for complete search history.

(56) References Cited

U.S. PATENT DOCUMENTS 7,512,985 B1 * 3/2009 Grabarnik ........... G06F 21/6263 707/999.009
11,461,551 B1 * 10/2022 Thaine ................ G06F 16/3347
2005/0193053 A1 * 9/2005 Kendall .............. G06F 16/9577 709/200
2006/0064411 A1 * 3/2006 Gross ................ G06F 16/90324
2007/0118876 A1 * 5/2007 Singh .................... H04L 63/107 726/2
2007/0239682 A1 * 10/2007 Arellanes .......... G06F 16/90324
2009/0112805 A1 * 4/2009 Garbow .............. G06F 16/9538
2011/0225192 A1 * 9/2011 Imig ................... G06F 16/3325 707/775
2012/0253942 A1 * 10/2012 Garfinkle ........... G06Q 30/0269 705/14.66
2014/0337317 A1 * 11/2014 Woss .................. G06F 21/6263 707/722
2015/0026815 A1 * 1/2015 Barrett ................ G06F 21/6263 726/26
2015/0324600 A1 * 11/2015 Sethi .................. G06F 21/6218 726/27
2015/0347582 A1 * 12/2015 Lovelace ............. G06F 16/951 707/706
2017/0193123 A1 * 7/2017 Jones .................... G06F 40/134
2017/0270316 A1 * 9/2017 Ho .......................... G06F 40/30
2019/0179860 A1 * 6/2019 Gizzi Giaimo ........ G06Q 30/02

(Continued)

FOREIGN PATENT DOCUMENTS

WO WO-2015184392 A2 * 12/2015 ........... G06F 16/951

OTHER PUBLICATIONS

Sanchez-Rola et al., Bakingtimer: privacy analysis of server-side request processing time, Proceedings of the 35th Annual Computer Security Applications Conference, pp. 478-488 (2019) (Year: 2019).*

(Continued)

*Primary Examiner* — David P Zarka
(74) *Attorney, Agent, or Firm* — MASCHOFF BRENNAN

(57) ABSTRACT

A query by a user for an Internet search to be performed by a search engine may be received and a category of the query may be identified. Based on the category of the query, a level of privacy for the Internet search may be determined. The search engine may then perform the Internet search and storage of user-related data may be limited based on the determined level of privacy.

11 Claims, 4 Drawing Sheets

(56) References Cited

U.S. PATENT DOCUMENTS

| | | | | |
|---|---|---|---|---|
| 2021/0303731 | A1* | 9/2021 | Nanda | G06F 21/6245 |
| 2025/0005026 | A1* | 1/2025 | Balasubramanian | G06F 16/248 |

OTHER PUBLICATIONS

Sanchez-Rola et al., Cookies from the past: Timing server-side request processing code for history sniffing, Digital Threats: Research and Practice, pp. 1-24 (2020) (Year: 2020).*

* cited by examiner

PROTECTING THE PRIVACY OF USERS PERFORMING SENSITIVE INTERNET SEARCHES

BACKGROUND

Search engine privacy, or privacy that deals with user data being collected by search engines, has become an important issue for many search engine users. Many current search engines are limited to two privacy options: very little privacy or very close to total privacy. Users are often not able to tailor the level of privacy provided by search engines to a level that is appropriate for a given search. Thus, users are often left to choose between these two extremes when deciding on a search engine to use.

When a user performs a search, search engines that provide very little privacy may store a host of different types of user-related data. With this data, search engines often create a profile of for users that use the search engine, which can help the search engine display results and ads that are more specifically tailored to the user.

In some instances, users may not mind having a search engine collect data and create a profile for the user so that personalized results and ads are displayed. However, some users may prefer that data related to searches not be stored, especially if the search relates to something that is private to the user. Thus, users may have different privacy preferences depending on the search query. However, because search engines often apply a single level of privacy to all searched conducted on their sites and do not allow users to modify this level of privacy, users are forced to decide what is more important to their search engine experience: relevance of results or their privacy.

The subject matter claimed herein is not limited to embodiments that solve any disadvantages or that operate only in environments such as those described above. Rather, this background is only provided to illustrate one example technology area where some embodiments described herein may be practiced.

SUMMARY

In one embodiment, a computer-implemented method for protecting the privacy of users performing sensitive Internet searches may be performed, at least in part, by a computing device including one or more processors. The method may include receiving a query by a user for an Internet search to be performed by a search engine, identifying a category of the query, determining, based on the category of the query, a level of privacy for the Internet search; performing the Internet search, and storing, by the search engine, an amount of user-related data that is associated with the Internet search based on the determined level of privacy.

In some embodiments, the category of the query may be determined by vectorizing the query and analyzing one or more tags associated with the vectorized query. In these embodiments, the category of the query may be at least one of medical, legal, financial, sexual identity, political, and religion.

In some embodiments, at the lowest level of privacy, storage of user-related data may not be limited.

In some embodiments, the category of the query may be determined to be sensitive and storage of user-related data is limited. In these embodiments, at least one of a browser, an operating system, a language, an IP address, a location of the user, an identifier, a session ID, and a device fingerprint may not be stored by the search engine.

In some embodiments, the method may further include providing notice to the user of the determined level of privacy for the Internet search and allowing the user to override the determined level of privacy for the Internet search to a desired level of privacy for the Internet search. In these embodiments, the storing, by the search engine, of user-related data may be limited based on the desired level of privacy.

In some embodiments, one or more non-transitory computer-readable media may comprise one or more computer-readable instructions that, when executed by one or more processors of a computing device, cause the computing device to perform a method for protecting the privacy of users performing sensitive Internet searches.

In some embodiments, a computing device comprising one or more processors and one or more non-transitory computer-readable media comprising one or more computer-readable instructions that, when executed by the one or more processors, may cause the computing device to perform a method for protecting the privacy of users performing sensitive Internet searches.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings, in which.

DETAILED DESCRIPTION

Figure 1:
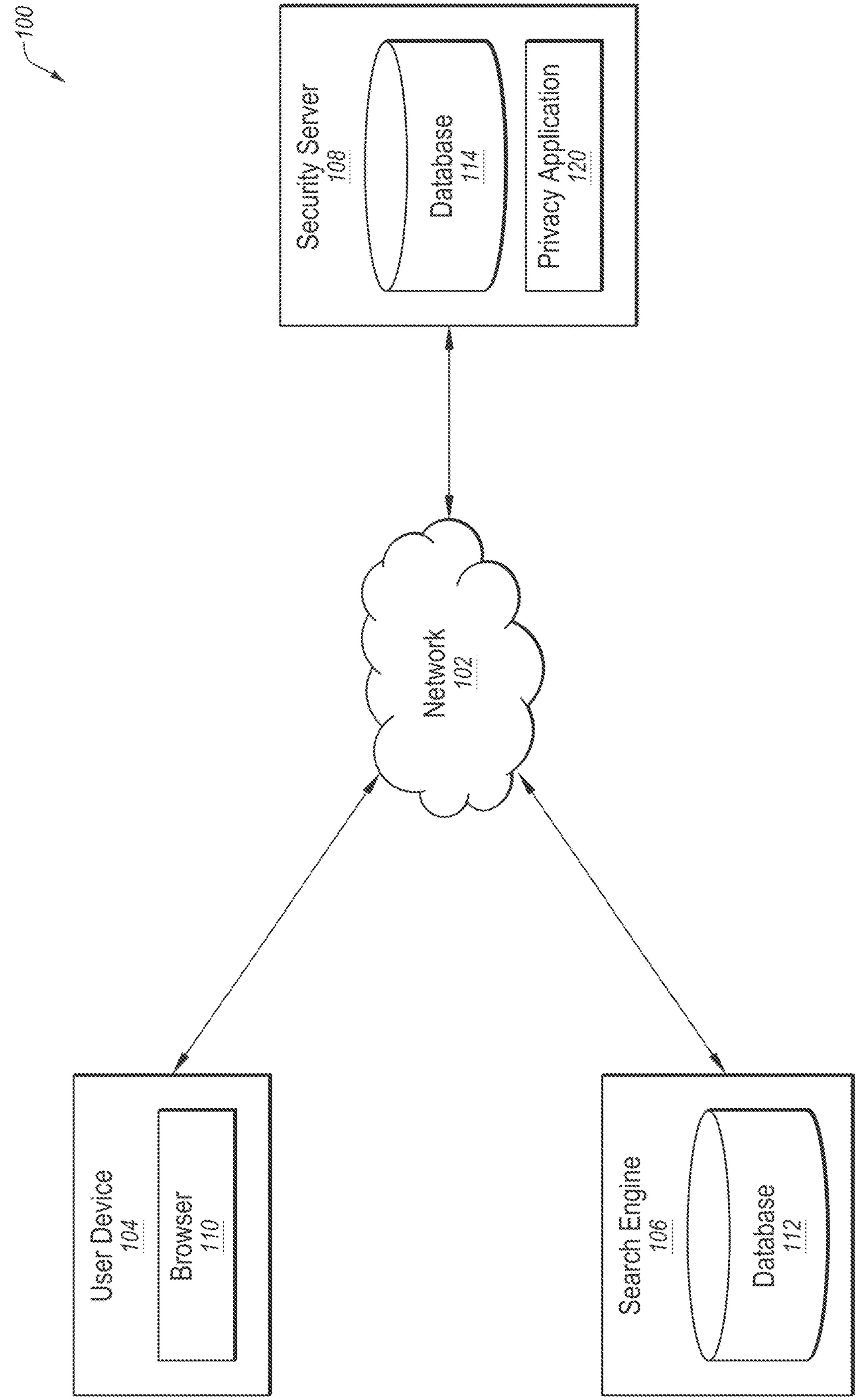
FIG. 1 illustrates an example system configured for protecting the privacy of users performing sensitive internet searches.

Search engine privacy, or privacy that deals with user data being collected by search engines, has become an important issues for many search engine users. Many current search engines are limited to two privacy options: very little privacy or very close to total privacy. Users are often not able to tailor the level of privacy provided by search engines to a level that is appropriate for a given search. Thus, users are often left to choose between these two extremes when deciding on a search engine to use.

When a user performs a search, search engines that provide very little privacy store user-related data. This data may include, but is not limited to, the user's search queries along with the time, date, and location of the search, the language of the search, the user's browser and operating system, one or more identifiers, the user's browsing history, a session ID, the user's IP address, cookies, the user's click-through history, and online/device fingerprints. Once this information is collected, search engines often create a profile of the user, which can help the search engine display results and ads that are more specifically tailored to the user.

In some instances, users may not mind having a search engine collect data and create a profile for the user. Accurate user profiles allow search engines to provide personalized results and ads. However, this collection of data can also be seen as an overreach by private companies for their own financial gain or as an intrusive surveillance tactic. In addition to storing information that a user may feel is private, search engines can make money by obtaining user-related data and creating user profiles. This is because advertisers are willing to pay a premium to present their ads to the most receptive consumers. In addition, when a search engine collects and catalogs large amounts of data about its users, there is the potential for it to be leaked or breached. Even if not a search engine database is not breached, this data may still be discovered. For example, the government can subpoena user-related data from search engines. Private litigants can also subpoena user-related data for use in civil cases, such as divorces and employment disputes.

Thus, users may have different privacy preferences depending on the search query. For example, users may not care about privacy when searching for general information about a location, but they may want privacy when searching about a personal illness. Because search engines often apply a single level of privacy to all searched conducted on their sites, users are forced to decide what is more important to their search engine experience: relevance of results or their privacy, and choose a search engine accordingly.

Some embodiments disclosed herein may enable protecting the privacy of users performing sensitive internet searches. In particular, in some embodiments, a query by a user for an Internet search to be performed by a search engine may be received and a category of the query may be identified. Based on the category of the query, a level of privacy for the Internet search may be determined. The search engine may then perform the Internet search and storage of user-related data may be limited based on the determined level of privacy.

Turning to the figures, FIG. 1 illustrates an example system 100 configured for protecting the privacy of users performing sensitive internet searches. The system 100 may include a network 102, a user device 104, a search engine 106, and a privacy server 108.

In some embodiments, the network 102 may be configured to communicatively couple the user device 104, the search engine 106, and the privacy server 108. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), a cellular network, the Internet, or some combination thereof.

Figure 4:
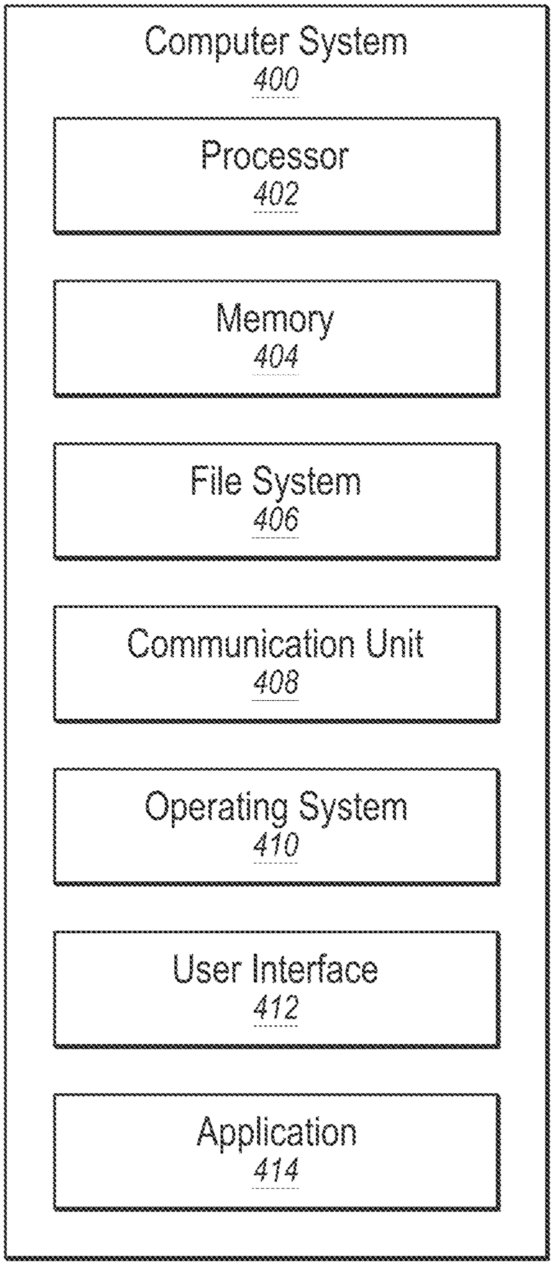
FIG. 4 illustrates an example computer system that may be employed in in protecting the privacy of users performing sensitive internet searches.

In some embodiments, the user device 104 may be any computer system capable of communicating over the network 102, examples of which are disclosed herein in connection with the computer system 400 of FIG. 4. The user device 104 includes a browser 110 and access to a search engine, such as the search engine 106.

In some embodiments, the search engine 106 may be any computer system capable of communicating over the network 102 and receiving and performing Internet searches, examples of which are disclosed herein in connection with the computer system 400 of FIG. 4. The search engine 106 includes a database 112. When a user performs a search on the search engine 106, the search engine 106 may obtain access to and store a variety of user-related data on the database 112. This data may include, but is not limited to, the user's search queries along with the time, date, and location of the search, the language of the search, the user's browser and operating system, one or more identifiers, the user's browsing history, a session ID, the user's IP address, cookies, the user's click-through history, and online/device fingerprints. Once this information is collected, the search engine 106 may create a profile of the user, which can help the search engine display results and ads that are more specifically tailored to the user.

In some embodiments, the privacy server 108 may be any computer system capable of communicating over the network 102, examples of which are disclosed herein in connection with the computer system 400 of FIG. 4. In some embodiments, the privacy server 108 includes a database 114 and a privacy application 120. As provided in more detail below, the privacy application 120 may receive a query from the user associated with the user device 104 through the search engine 106. The privacy application may identify a category of the query and, based on the determined category, determine a level of privacy for the Internet search. The privacy application may then provide this level of privacy for the Internet search to the search engine 106. The search engine 106 may then perform the Internet search and store an appropriate amount of user-related data based on the determined level of privacy.

Modifications, additions, or omissions may be made to the system 100 without departing from the scope of the present disclosure. For example, in some embodiments, the system 100 may include additional components similar to the components illustrated in FIG. 1 that each may be configured similarly to the components illustrated in FIG. 1. In one such embodiment, the system 100 may include additional search engines. In this embodiment, a query may be entered into a first search engine and the results may be displayed in another search engine. In another embodiment, a query may be entered into a first search engine, however the actual search may be performed by a second search engine and the results may be displayed back on the first search engine. Regardless of how the search is performed, the privacy application 120 may determine a level of privacy for the query so that the search engine that has access to user-related data is only storing an appropriate amount of this data.

In another embodiment, the user device 104 may also include a privacy application. In this embodiment, some or all of the functions performed by the privacy application 120 may be split between the privacy application 120 on the privacy server and the privacy application installed on the user device 104.

Figure 2:
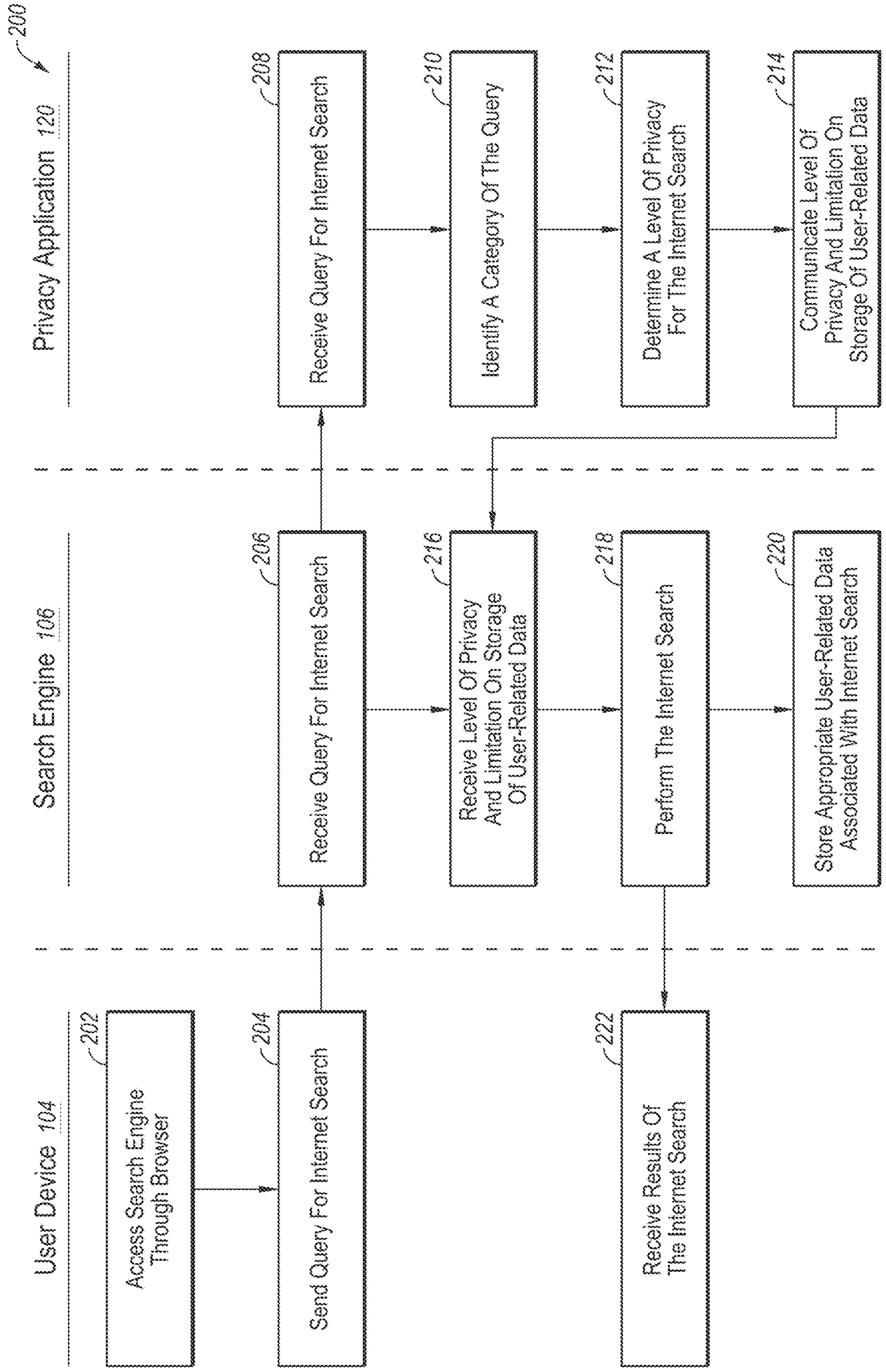
FIG. 2 illustrates a process flow diagram for protecting the privacy of users performing sensitive internet searches.

FIG. 2 illustrates a process flow diagram 200 that the user device 104, the search engine 106, and the privacy application 120 from FIG. 1 may follow for protecting the privacy of users performing sensitive internet searches. As disclosed in FIG. 2, in a step 202, the user device 104 may access the search engine 106 through the browser 110. In a step 204, the browser 110 may send a query for an Internet search to the search engine 106.

In a step 206, this query may be received by the search engine 106. In a step 208, this query may also be received by the privacy application 120. In a step 210, the privacy application 120 may identify a category of the query. In one embodiment, to identify a category, the privacy application may vectorize the query. Tags that are associated with the query may then be analyzed to determine a category of the query. In another embodiment, individual words or phrases within a query may be analyzed and compared a list of keywords or phrases that are known to be associated with certain categories of searches. The privacy application 120 may place the query into any number of different categories.

Examples of possible categories include, but are not necessarily limited to general information searches and searches relating to technology, sports, video games, medical, legal, financial, sexual identity, political, and religion. Another category may include navigational searches.

In a step 212, a level of privacy may be determined for each category of query. Different amounts of user-related data may be stored at the different levels of privacy. For example, if a query falls within a category that has a low level of privacy, the privacy application 120 may not limit storage of user-related data by the search engine 106. On the other hand, if a query falls within a category that has something other than the lowest level of privacy, the privacy application 120 may limit storage of user-related data by the search engine 106. For example, at the highest level of privacy, the privacy application 120 may prevent the search engine 106 from storing the user's search queries along with the time, date, and location of the search, the language of the search, the user's browser and operating system, one or more identifiers, the user's browsing history, a session ID, the user's IP address, cookies, the user's click-through history, and online/device fingerprints. At levels of privacy that fall between the highest and the lowest levels, the privacy application 120 may permit different amounts of user-related data to be stored by the search engine 106.

General searches about nonprivate topics, such as current events or sports may be assigned to a category that has a low level of privacy. However informational searches about sexual identity or religion may be assigned to a category that has a high level of privacy. Other categories may have levels of privacy that have a moderate level of privacy.

Once the privacy application 120 has determined a level of privacy for the Internet search, it may communicate this level of privacy to the search engine 106 in a step 214, and the search engine may receive the level of privacy for the Internet search at step 216. Finally, at step 218, the search engine 106 may perform the Internet search and at step 220, the appropriate user-related data may be stored by the search engine 106. At step 222, the results of the Internet search may be received by the user device 104.

Because the privacy application 120 automatically performs all of the steps associated with determining and enforcing a limitation on the level of privacy for a user's search, the user does not need to evaluate the query and determine the appropriate level of search. This allows the search engine 106 to gather user related data for searches that are not private and this data can be used to provide the user with more personalized search results in future searches. On the other hand, user-related data is not stored for private searches that include sensitive topics.

Figure 3:
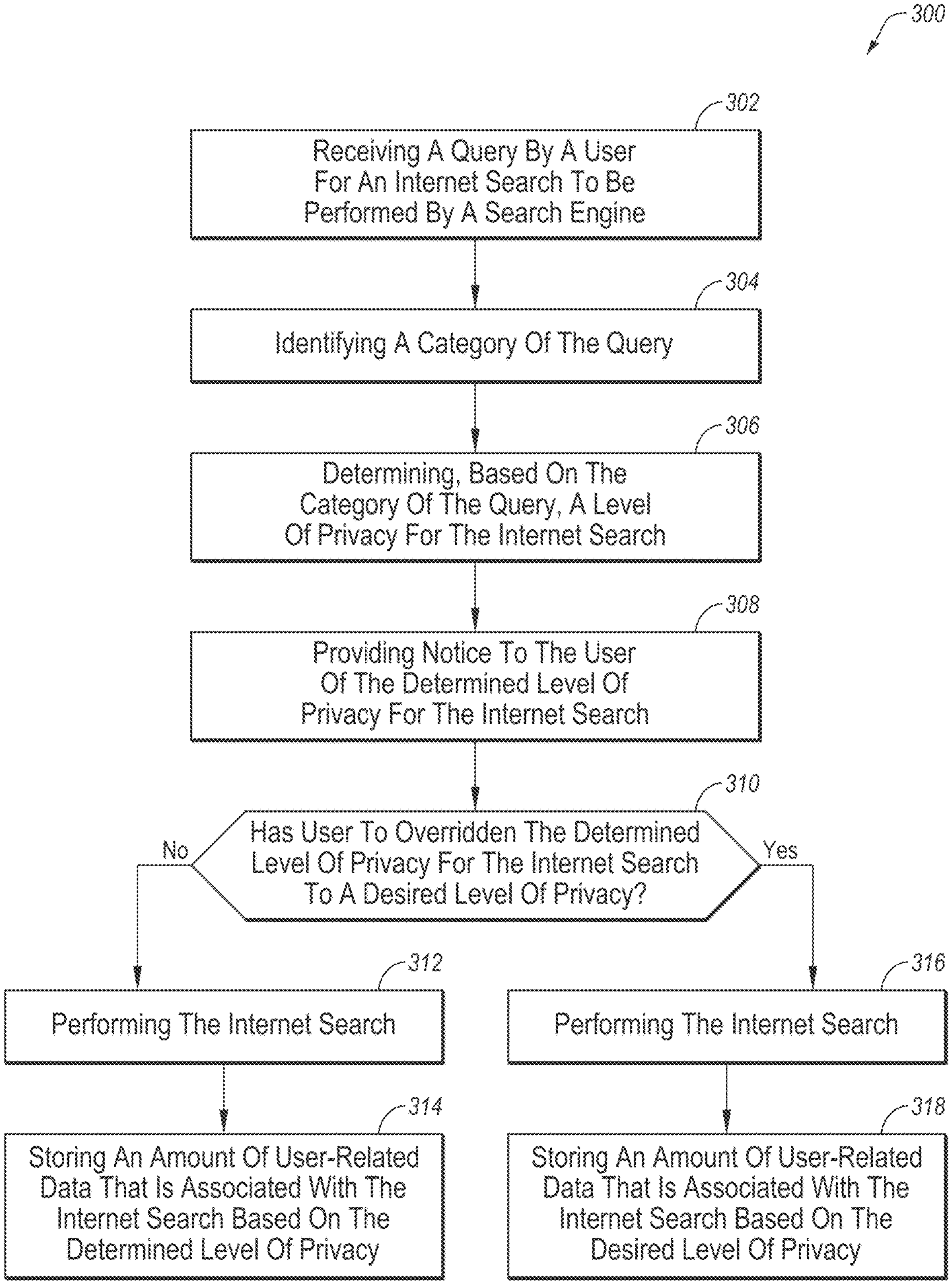
FIG. 3 illustrates a flowchart of an example method for protecting the privacy of users performing sensitive internet searches.

FIG. 3 illustrates a flowchart of an example method 300 for protecting the privacy of users performing sensitive internet searches. The method 300 may be performed, in some embodiments, by a device or system, such as by the privacy application 120 of FIGS. 1 and 2. In these and other embodiments, the method 300 may be performed by one or more processors based on one or more computer-readable instructions stored on one or more non-transitory computer-readable media.

The method 300 may include, at action 302, receiving a query by a user for an Internet search to be performed by a search engine. The method 300 may include, at action 304, identifying a category of the query. The category of the query may be identified, in some embodiments, by vectorizing the query and tags associated with the vectorized query may be analyzed to determine the category of the query. In other embodiments, words and phrases of the query may be compared against keys words or phrases that correspond to specific categories. Categories into which the queries maybe placed include but are not necessarily limited to medical, legal, financial, sexual identity, political, and religion.

The method 300 may include, at action 306, determining, based on the category of the query, a level of privacy for the Internet search. Different privacy levels may correspond to different categories and each level of privacy may have identify the user-related data that the search engine is allowed to, or prevented from, saving. For example, for queries that fall within a category that has a high level of privacy, a search engine may not store any user-related data. However, for queries that fall within categories that have a lower level of privacy, a search engine may store more user-related data. Thus, the level of privacy of a category in which a query falls will determine an amount of user-related data to store.

The method 300 may include, at action 308, providing notice to the user of the determined level of privacy for the Internet search. This notice may be provided visually with colors. For example, a red symbol may indicate a high level of privacy, an orange symbol may indicate an intermediate level of privacy, and a green symbol may indicate a low level of privacy. Alternatively, the level of privacy may be provided with alphanumeric characters.

Regardless of how the user is provided with notice of the level of privacy, a user may be permitted to override the determined level of privacy and identify a desired level of privacy at which to perform the Internet search. Thus, at action 310, whether the user has overridden the determined level of privacy for the Internet search to a desired level of privacy may be determined. If the user has not overridden the determined level of privacy, at action 312, the Internet search may be performed at the determined level of privacy. If the user has overridden the determined level of privacy, at action 314, the Internet search may be performed at the desired level of privacy.

Although the actions of the method 300 are illustrated in FIG. 3 as discrete actions, various actions may be divided into additional actions, combined into fewer actions, reordered, expanded, or eliminated, depending on the desired implementation. For example, in some embodiments, a user may not be provided notice of the level of privacy for the Internet search. In these embodiments, the Internet search may be performed at the determined level of privacy without any user interaction.

It is also understood that the method 300 may improve the functioning of a computer system itself. For example, a search engine may produce results of an Internet search more quickly if it is not expending resources obtaining and storing user-related data, or generating a user profile. As the amount of user-related data to be stored increases, the efficiency of the search and the amount of time it takes to return results may decrease. In addition, there are database efficiencies achieved by reducing an amount of user-related data that is stored. Specifically, less data stored requires less available space on a database. Thus, as an amount of data stored is reduced, there will exist more available storage space on a search engine database.

Further, the method 300 may improve the technical field of Internet privacy. By automatically identifying a category of an Internet search query, and determining an appropriate level of privacy to be associated with each category, searches having different levels of privacy can be performed using the same search engine. The method 300 avoids the necessity for users to choose between relevance of their search results and their privacy.

FIG. 4 illustrates an example computer system 400 that may be employed in in protecting the privacy of users performing sensitive internet searches. In some embodiments, the computer system 400 may be part of any of the systems or devices described in this disclosure. For example, the computer system 400 may be part of any of the user device 104, the search engine 106 and the privacy server 108.

The computer system 400 may include a processor 402, a memory 404, a file system 406, a communication unit 408, an operating system 410, a user interface 412, and an application 414, which all may be communicatively coupled. In some embodiments, the computer system may be, for example, a desktop computer, a client computer, a server computer, a mobile phone, a laptop computer, a smartphone, a smartwatch, a tablet computer, a portable music player, a networking device, or any other computer system.

Generally, the processor 402 may include any suitable special-purpose or general-purpose computer, computing entity, or processing device including various computer hardware or software applications and may be configured to execute instructions stored on any applicable computer-readable storage media. For example, the processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 402 may interpret and/or execute program instructions and/or process data stored in the memory 404 and/or the file system 406. In some embodiments, the processor 402 may fetch program instructions from the file system 406 and load the program instructions into the memory 404. After the program instructions are loaded into the memory 404, the processor 402 may execute the program instructions. In some embodiments, the instructions may include the processor 402 performing one or more of the actions of the methods disclosed herein.

The memory 404 and the file system 406 may include computer-readable storage media for carrying or having stored thereon computer-executable instructions or data structures. Such computer-readable storage media may be any available non-transitory media that may be accessed by a general-purpose or special-purpose computer, such as the processor 402. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 402 to perform a certain operation or group of operations, such as one or more of the actions of the methods disclosed herein. These computer-executable instructions may be included, for example, in the operating system 410, in one or more applications, such as the privacy application 120, or in some combination thereof.

The communication unit 408 may include any component, device, system, or combination thereof configured to transmit or receive information over a network, such as the network 102 of FIG. 1. In some embodiments, the communication unit 408 may communicate with other devices at other locations, the same location, or even other components within the same system. For example, the communication unit 408 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 408 may permit data to be exchanged with a network and/or any other devices or systems, such as those described in the present disclosure.

The operating system 410 may be configured to manage hardware and software resources of the computer system 400 and configured to provide common services for the computer system 400.

The user interface 412 may include any device configured to allow a user to interface with the computer system 400. For example, the user interface 412 may include a display, such as an LCD, LED, or other display, that is configured to present video, text, application user interfaces, and other data as directed by the processor 402. The user interface 412 may further include a mouse, a track pad, a keyboard, a touchscreen, volume controls, other buttons, a speaker, a microphone, a camera, any peripheral device, or other input or output device. The user interface 412 may receive input from a user and provide the input to the processor 402. Similarly, the user interface 412 may present output to a user.

The application 414 may be one or more computer-readable instructions stored on one or more non-transitory computer-readable media, such as the memory 404 or the file system 406, that, when executed by the processor 402, is configured to perform one or more of the actions of the methods disclosed herein. In some embodiments, the application 414 may be part of the operating system 410 or may be part of an application of the computer system 400, or may be some combination thereof. In some embodiments, the application 414 may function as the privacy application 120.

Modifications, additions, or omissions may be made to the computer system 400 without departing from the scope of the present disclosure. For example, although each is illustrated as a single component in FIG. 4, any of the components 402-414 of the computer system 400 may include multiple similar components that function collectively and are communicatively coupled. Further, although illustrated as a single computer system, it is understood that the computer system 400 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 402 of FIG. 4) including various computer hardware or software applications, as discussed in greater detail below. Further, as indicated above, embodiments described herein may be implemented using computer-readable media (e.g., the memory 404 or file system 406 of FIG. 4) for carrying or having computer-executable instructions or data structures stored thereon.

In some embodiments, the different components and applications described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absent a showing that the terms "first," "second," "third," etc., connote a specific order, these terms should not be understood to connote a specific order. Furthermore, absent a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for protecting a privacy of users performing sensitive Internet searches, at least a portion of the method being performed by a computing device comprising one or more processors, the method comprising:

- receiving a first query for a first Internet search to be performed by a search engine;
- identifying a category of the first query;
- determining, based on the category of the first query, a level of privacy for the first Internet search;
- performing the first Internet search;
- storing, by the search engine, a first amount of user-related data that is associated with the first Internet search based on the determined level of privacy for the first Internet search, wherein the category of the first query has a low level of privacy and the first amount of user-related data stored by the search engine is not limited;
- receiving a second query for a second Internet search to be performed by the search engine;
- identifying a category of the second query;
- determining, based on the category of the second query, a level of privacy for the second Internet search;
- performing the second Internet search; and
- storing, by the search engine, a second amount of user-related data that is associated with the second Internet search based on the determined level of privacy for the second Internet search, wherein the category of the second query is determined to be sensitive and the second amount of user-related data stored by the search engineer is limited;
- wherein, the first and second amounts of user-related data stored by the search engine are different.

2. The method of claim 1, wherein the category of the first query is determined by vectorizing the first query and analyzing one or more tags associated with the vectorized query.

3. The method of claim 2, wherein the category of the first query is at least one of medical, legal, financial, sexual identity, political, and religion.

4. The method of claim 1, wherein at least one of a browser, an operating system, a language, an IP address, a location of a user, an identifier, a session ID, and a device fingerprint are not included in the first amount of user-related data stored by the search engine.

5. The method of claim 1, further comprising providing notice of the determined levels of privacy for the first and second Internet searches.

6. The method of claim 5, further comprising allowing a user to override the determined level of privacy for the first Internet search to a desired level of privacy for the first Internet search, wherein the storing, by the search engine, of the first amount of user-related data is limited based on the desired level of privacy.

7. A computing device comprising:

one or more processors; and one or more non-transitory computer-readable media comprising one or more computer-readable instructions that, when executed by the one or more processors, cause the computing device to perform a method for protecting a privacy of users performing sensitive Internet searches, the method comprising:

receiving a first query for a first Internet search to be performed by a search engine;

identifying a category of the first query;

determining, based on the category of the first query, a level of privacy for the first Internet search;

performing the first Internet search;

storing, by the search engine, a first amount of user-related data that is associated with the first Internet search based on the determined level of privacy for the first Internet search, wherein the category of the first query has a low level of privacy and the first amount of user-related data stored by the search engine is not limited;

receiving a second query for a second Internet search to be performed by the search engine;

identifying a category of the second query;

determining, based on the category of the second query, a level of privacy for the second Internet search;

performing the second Internet search; and storing, by the search engine, a second amount of user-related data that is associated with the second Internet search based on the determined level of privacy for the second Internet search, wherein the category of the second query is determined to be sensitive and the second amount of user-related data stored by the search engine is limited;

wherein, the first and second amounts of user-related data stored by the search engine are different.

8. The computing device of claim 7, wherein the category of the first query is determined by vectorizing the first query and analyzing one or more tags associated with the vectorized query.

9. The computing device of claim 7, wherein at least one of a browser, an operating system, a language, an IP address, a location of a user, an identifier, a session ID, and a device fingerprint are not included in the second amount of user-related data stored by the search engine.

10. The computing device of claim 7, wherein the method further comprises providing notice of the determined level of privacy for the first Internet search.

11. The computing device of claim 7, wherein the method further comprises allowing a user to override the determined level of privacy for the first Internet search to a desired level of privacy for the Internet search, wherein the storing, by the search engine, of the first user-related data is limited based on the desired level of privacy.

* * * * *